United States Patent

Takiguchi

[11] Patent Number: 5,899,831
[45] Date of Patent: May 4, 1999

[54] AUTOMATIC TRANSMISSION UPSHIFT CONTROL APPARATUS

[75] Inventor: Masahiro Takiguchi, Shizuoka, Japan

[73] Assignee: Jatco Corporation, Shizuoka, Japan

[21] Appl. No.: 08/992,432

[22] Filed: Dec. 18, 1997

[30] Foreign Application Priority Data

Dec. 19, 1996 [JP] Japan .................................. 8-339233

[51] Int. Cl.$^6$ .................................................. F16H 61/04
[52] U.S. Cl. .......................... 477/151; 477/143; 477/150; 475/129
[58] Field of Search .................................... 477/143, 150, 477/151–152, 156, 158, 145, 146; 475/128, 129, 116

[56] References Cited

U.S. PATENT DOCUMENTS

| 4,428,258 | 1/1984 | Kubo et al. | 477/151 |
|---|---|---|---|
| 4,942,530 | 7/1990 | Boda et al. | 477/152 X |
| 4,995,284 | 2/1991 | Takada et al. | 477/151 |
| 5,005,441 | 4/1991 | Narita | 477/151 |
| 5,138,906 | 8/1992 | Iwatsuki et al. | 477/152 |
| 5,405,303 | 4/1995 | Takada et al. | 477/158 X |
| 5,431,608 | 7/1995 | Hirose . | |
| 5,565,001 | 10/1996 | Sakai et al. | 477/143 |
| 5,588,927 | 12/1996 | Tsukamoto et al. | 475/128 |
| 5,613,921 | 3/1997 | Sugiyama et al. | 477/156 X |
| 5,616,094 | 4/1997 | Tsukamoto et al. | 475/128 |

FOREIGN PATENT DOCUMENTS

5-248526   9/1993   Japan .

*Primary Examiner*—Dirk Wright
*Assistant Examiner*—Peter T. Kwon
*Attorney, Agent, or Firm*—Foley & Lardner

[57] ABSTRACT

An upshift is effected by releasing an engaged first friction element and engaging a released second friction element. The first fiction element operates on a fluid pressure applied thereto through a first passage and the second friction element operates on a fluid pressure applied thereto through a second passage. An accumulator is provided in the first fluid passage. The accumulator has a back pressure port through which a back pressure is applied thereto by the function of a control valve having a first port connected to the back pressure port, a second port connected to a source of back pressure and a third port connected to a drain. The control valve operates, between a first position connecting the first port to second port and a second position connecting the first port to the third port, on first and second working signal pressures applied thereto. The first working signal pressure is the fluid pressure applied through the second passage to the second friction element and the second working signal pressure corresponds to the engine load. The control valve changes from the first position to the second position when a pressure difference between the first and second working signal pressures reaches a predetermined value. The application of the first working signal pressure to the control valve is inhibited for a predetermined time after an upshift is commanded in the automatic transmission or until the existing gear ratio reaches the gear ratio provided when the upshift is commanded in the automatic transmission.

5 Claims, 11 Drawing Sheets

| | R/C | H/C | 2-4/B | L/C | L&R/B | LOW O.W.C |
|---|---|---|---|---|---|---|
| 1st | | | | ○ | ◌ | ◍ |
| 2nd | | | ○ | ○ | | |
| 3rd | | ○ | | ○ | | |
| 4th | | ○ | ○ | | | |
| Rev | ○ | | | | ○ | |

| GEAR POSITION \ SOLENOID | FIRST SHIFT SOLENOID | SECOND SHIFT SOLENOID |
|---|---|---|
| 1st SPEED | ON | ON |
| 2nd SPEED | OFF | ON |
| 3rd SPEED | OFF | OFF |
| 4th SPEED | ON | ON |

AUTOMATIC TRANSMISSION UPSHIFT CONTROL APPARATUS

BACKGROUND OF THE INVENTION

This invention relates to an upshift control apparatus for use in an automotive vehicle having an automatic transmission for effecting an upshift from a current gear ratio to a target higher gear ratio by releasing an engaged first friction element and engaging a released second friction element.

Figure 12:
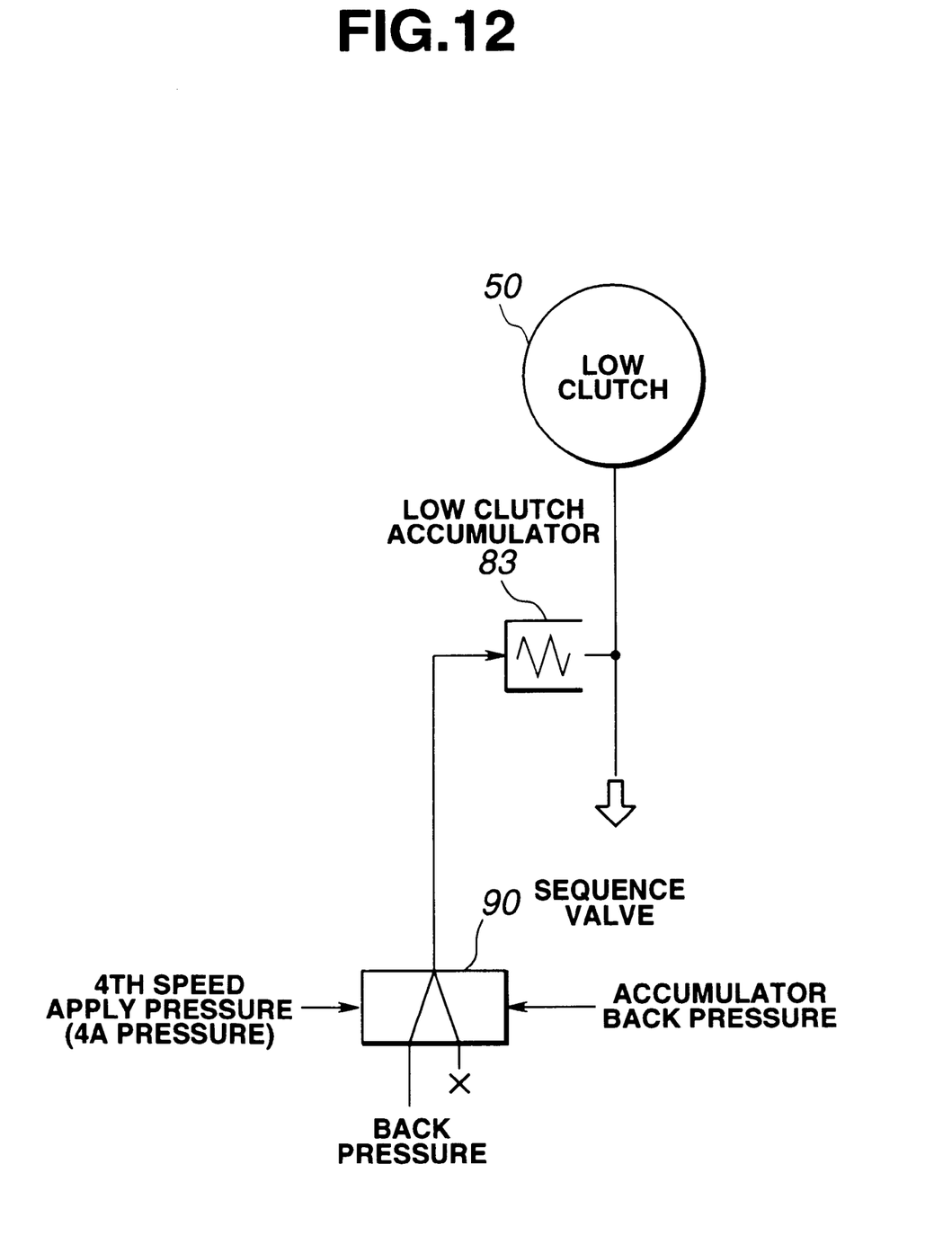
FIG. 12 is a schematic diagram used in explaining a conventional upshift control apparatus.
Figure 13:
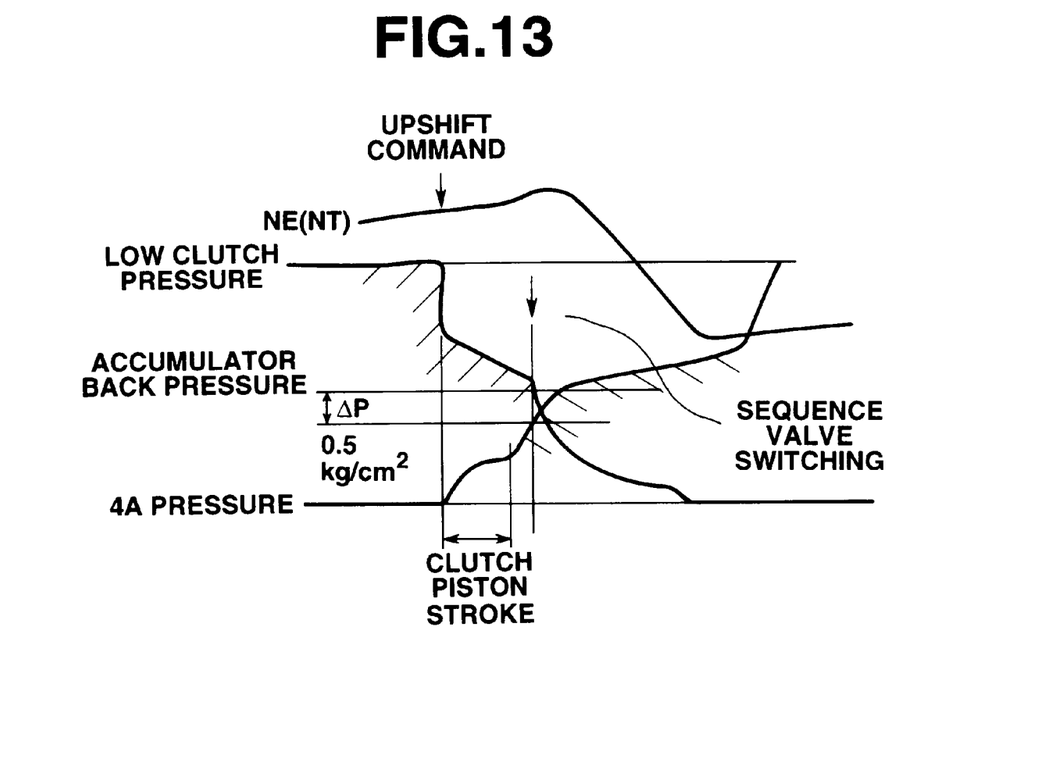
FIG. 13 contains graphs showing the transient characteristics of engine speed and clutch apply pressure during a 2–3 upshift effected under a wide-open throttle condition.
Figure 14:
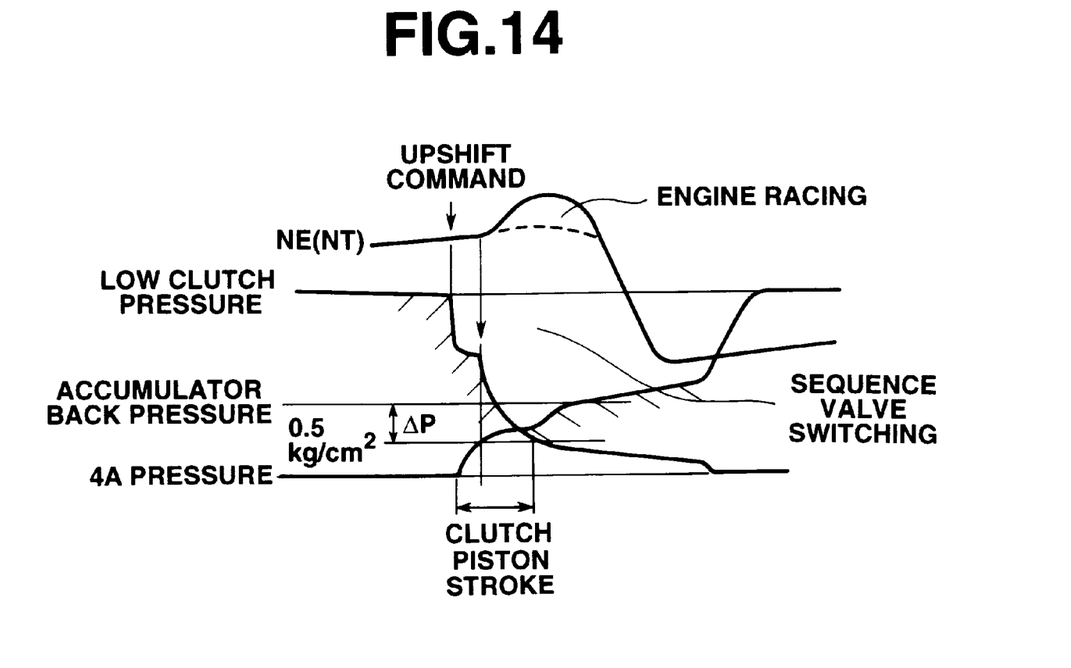
FIG. 14 contains graphs showing the transient characteristics of engine speed and clutch apply pressure during a 2–3 upshift under a narrow-open throttle condition.

Automatic transmission upshift control apparatus have been proposed, for example, in Japanese Patent Kokai No. 5-248526 which discloses a low clutch sequence valve 90 provided to adjust the back pressure in a low clutch accumulator 83 associated with a low clutch 50, as shown in FIG. 12. During a 3–4 upshift operation where the unshown band brake is engaged, the low clutch sequence valve 90 changes to a first position connecting the low clutch accumulator 83 to the drain from a second position connecting the low clutch accumulator 83 to a source of back pressure when a difference between an accumulator back pressure and a 4th speed apply pressure reaches a predetermined value, for example, 0.5 kg/cm$^2$. If the 3–4 upshift is effected with the accelerator pedal being depressed to produce a sufficient accumulator back pressure, the low clutch sequence valve 90 will change to the first position just after the stroke of the servo piston of the band brake is completed so that the low clutch pressure decreases at an appropriate time with respect to the increase of the 4th speed apply pressure, as shown in FIG. 13. If the 3–4 upshift is effected with an insufficient accumulator back pressure, for example, with the accelerator pedal being released, however, the low clutch sequence valve 90 will change to the first position before the stroke of the servo piston of the band brake is completed, causing engine racing when both of the low clutch 50 and the band brake are released, as shown in FIG. 14.

SUMMARY OF THE INVENTION

It is one object of the invention to provide an automatic transmission upshift control apparatus which can operate in a power-off back pressure control mode to effect an upshift without engine racing, which may occur when the accelerator pedal is depressed at the start of the upshift operation, a torque drop and a feeling of slow shifting to the operator.

Another object of the invention is to provide an automatic transmission upshift control apparatus which can operate in a low-load (low-throttle) power-on back pressure control mode to prevent the time of the shock resulting from a torque drop from being elongated while ensuring a good shift quality without engine racing during the upshift operation.

Still another object of the invention is to provide an automatic transmission upshift control apparatus which can operate in a high-load (high-throttle) power-on back pressure control mode to prevent a shock resulting from a torque drop or "shelf-off" while preventing engine racing during the 2–3 upshift operation.

There is provided, in accordance with the invention, an upshift control apparatus for use with an automotive vehicle having an engine, an accelerator and an automatic transmission having a first fiction element operable between engaged and released positions on a fluid pressure applied thereto through a first passage and a second friction element operable between engaged and released positions on a fluid pressure applied thereto through a second passage for controlling the fluid pressures to change the first friction element from the engaged position to the released position and the second friction element from the released position to the engaged position so as to effect an upshift from a current gear ratio to a lower target gear ratio. The upshift control apparatus comprises means for detecting engine load, an accumulator provided in the first fluid passage, the accumulator having a back pressure port through which a back pressure is applied thereto, and a control valve having a first port connected to the back pressure port, a second port connected to a source of back pressure and a third port connected to a drain, the control valve being operable, between a first position connecting the first port to second port and a second position connecting the first port to the third port, on first and second working signal pressures applied thereto, the first working signal pressure being the fluid pressure applied through the second passage to the second friction element, the second working signal pressure corresponding to the detected engine load, the control valve being operable to change from the first position to the second position when a pressure difference between the first and second working signal pressures reaches a predetermined value. The upshift control apparatus also comprises a control unit for preventing application of the first working signal pressure to the control valve for a predetermined time after an upshift is commanded in the automatic transmission.

In another aspect of the invention, the control unit includes means for producing a power-on control signal when the upshift is commanded in the automatic transmission with the accelerator being depressed, means responsive to the power-on control signal for producing a low-load power-on control signal when the detected engine load is equal to or less than a predetermined engine load value, means for detecting a gear ratio provided in the automatic transmission, means responsive to the low-load power-on control signal for producing a valve control signal until the detected gear ratio reaches a gear ratio provided when the upshift is commanded, and means for preventing the application of the first working signal pressure to the control valve in the presence of the valve control signal.

BRIEF DESCRIPTION OF THE DRAWING

This invention will be described in greater detail by reference to the following description taken in connection with the accompanying drawings, in which.

DETAILED DESCRIPTION OF THE INVENTION

Figure 1:
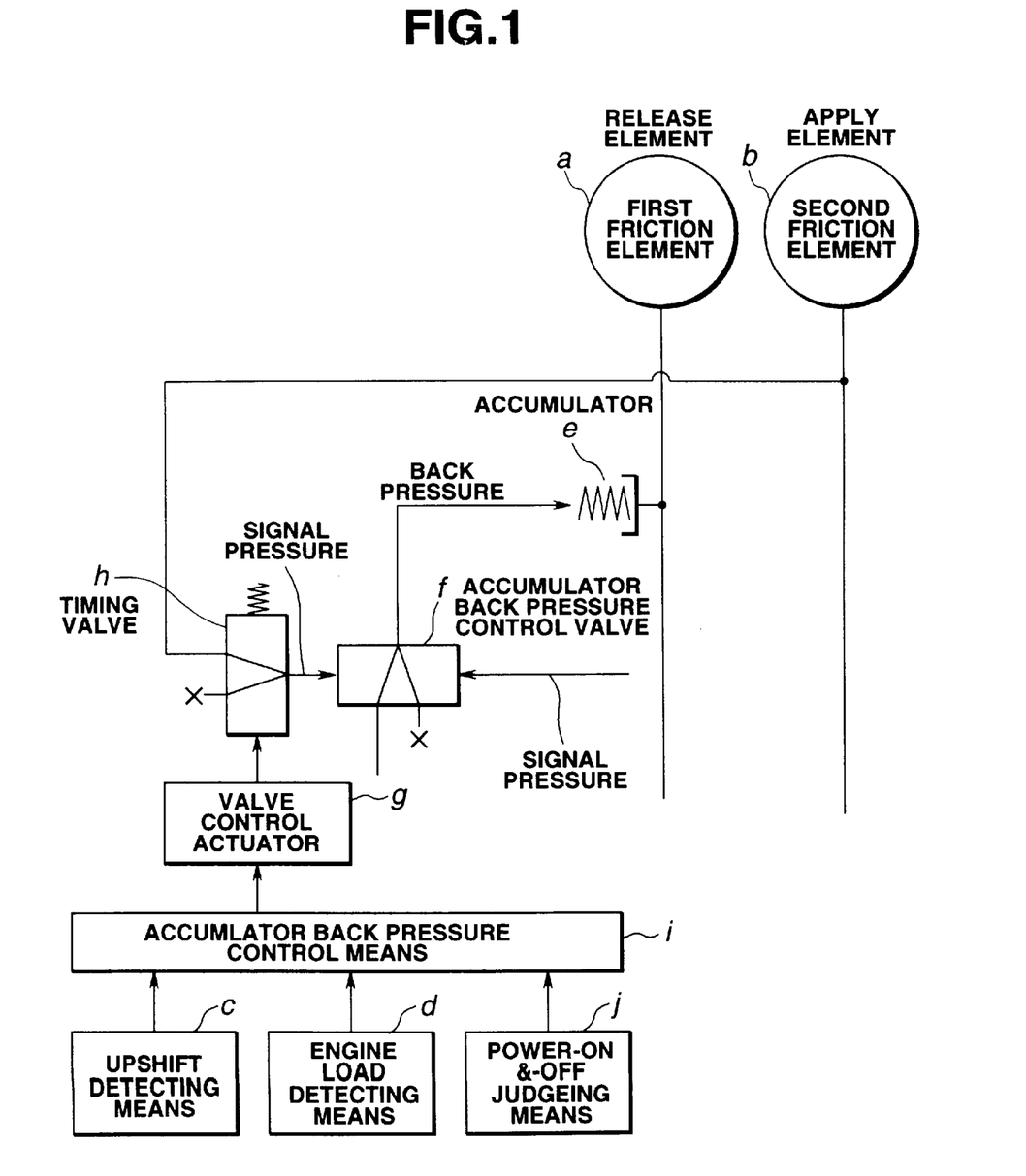
FIG. 1 is a schematic block diagram showing a basic arrangement of an upshift control apparatus made in accordance with the invention.

With reference to the drawings and in particular to FIG. 1, there is shown a schematic block diagram of an upshift control apparatus made in accordance with the invention. The upshift control apparatus is intended for use with an automotive vehicle having an engine, an accelerator and an automatic transmission having a first fiction (torque transmitting) element (a) operable between engaged and released positions on a fluid pressure applied thereto through a first passage and a second friction (torque transmitting) element (b) operable between engaged and released positions on a fluid pressure applied thereto through a second passage for controlling the fluid pressures to change the first friction element (a) from the engaged position to the released position and the second friction element (b) from the released position to the engaged position so as to effect an upshift from a current gear ratio to a higher target gear ratio. The upshift control apparatus comprises an upshift detecting means (c) for producing an upshift command signal when an upshift is commanded in the automatic transmission, a power-on judging means (j) responsive to the upshift command signal for producing a power-on control signal when the accelerator is depressed and a power-off control signal when the accelerator is released, an engine load detecting means (d) for detecting engine load, an accumulator (e) provided in the first fluid passage. The accumulator (e) has a back pressure port through which a back pressure is applied thereto. An accumulator back pressure control valve (f) has a first port connected to the back pressure port, a second port connected to a source of back pressure and a third port connected to a drain. The control valve (f) is operable, between a first position connecting the first port to second port and a second position connecting the first port to the third port, on first and second working signal pressures applied thereto. The first working pressure is the fluid pressure applied through the second passage to the second friction element (b) and the second working pressure corresponding to the detected engine load. The control valve (f) is operable to change from the first position to the second position when a pressure difference between the first and second working signal pressures reaches a predetermined value. The upshift control apparatus also includes a valve control actuator (g) responsive to the power-off control signal for producing a valve control signal for a time somewhat shorter than a piston stroke time required for one stroke of a piston of the second friction element (b) after the upshift command signal is produced, and a timing valve (h) for preventing application of the first working signal pressure to the control valve (f) in the presence of the valve control signal.

Figure 2:
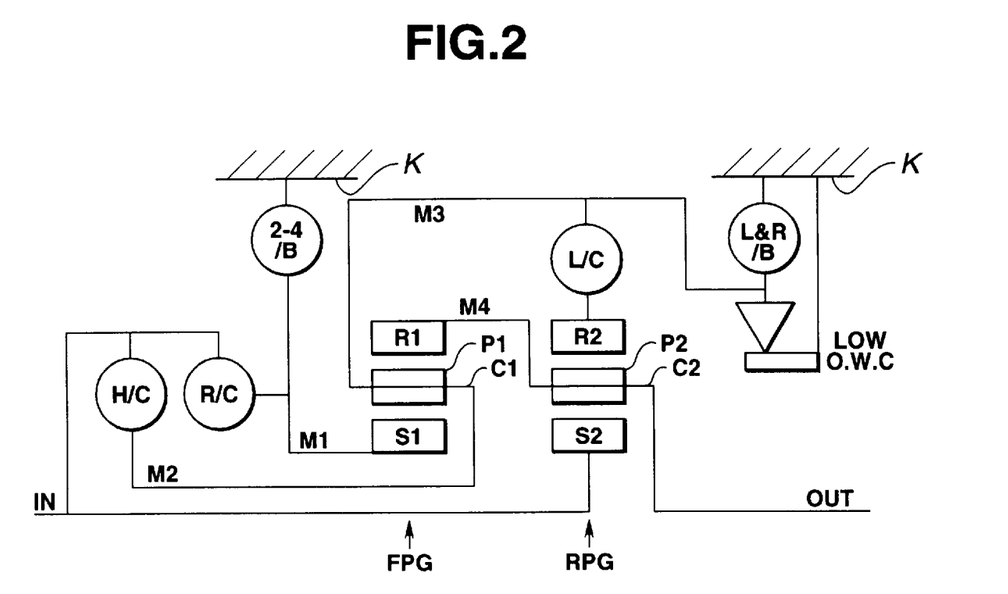
FIG. 2 is a schematic diagram showing a gear train included in an automatic transmission to which the invention is applicable.

Referring to FIG. 2, there is shown a gear train GT used in the automatic transmission. A drive from an engine is transmitted to the gear train GT through a torque converter (not shown). The gear train GT includes front and rear planetary gear units FPG and RPG arranged in tandem with each other. The front planetary gear unit FPG has a first sun gear S1, a first ring gear R1, a first pinion gear P1 and a first pinion carrier C1. The rear planetary gear unit RPG has a second sun gear S2, a second ring gear R2, a second pinion gear P2 and a second pinion carrier C2. The gear train GT also has various friction elements (torque transmitting elements) including a reverse clutch R/C, a high clutch H/C, a low clutch L/C and a high clutch H/C. The first sun gear S1 is connected through a first rotary member M1 to the reverse clutch R/C and hence to the input shaft IN of the automatic transmission. The first pinion carrier C1 is connected through a second rotary member M2 and hence to the input shaft IN and also through a third rotary member M3 to the low clutch L/C and hence to the second ring gear R2. The first ring gear R1 is connected through a fourth rotary member M4 to the second pinion carrier C2 which is connected directly to the output shaft OUT of the automatic transmission. The second sun gear S2 is connected directly to the input shaft IN. The friction elements also include a 2–4 brake 2–4/B for fixing the first sun gear S1 through the first rotary member M1 to a grounded or stationary member such as the transmission case K, a low and reverse brake L&R/B for fixing the first pinion carrier C1 through the third rotary member M3 to the transmission case K, and a one-way clutch LOW/O.W.C provided between the first pinion carrier C1 and the transmission case K. The one-way clutch LOW/O.W.C is connected in parallel with the low and reverse clutch L&R/B. The 2–4 brake 2–4/B is a multi-plate brake like multi-plate clutches. The gear train GT is arranged to reduce its size and weight by minimizing the number of friction elements required for providing good engine performance. The removed friction elements include a one-way clutch used to begin a 4-3 downshift operation at an appropriate time to realize shockless downshift operation and a clutch used, with the use of such a one-way clutch, to ensure a good engine brake effect. Each of the low clutch L/C, the high clutch H/C, the reverse clutch R/C, the low and reverse brake L&R/B and the 2–4 brake 2–4/B is operated hydraulically between its engaged or disengaged states. The one-way clutch LOW/O.W.C is operated mechanically between its engaged and disengaged states.

Figure 3:
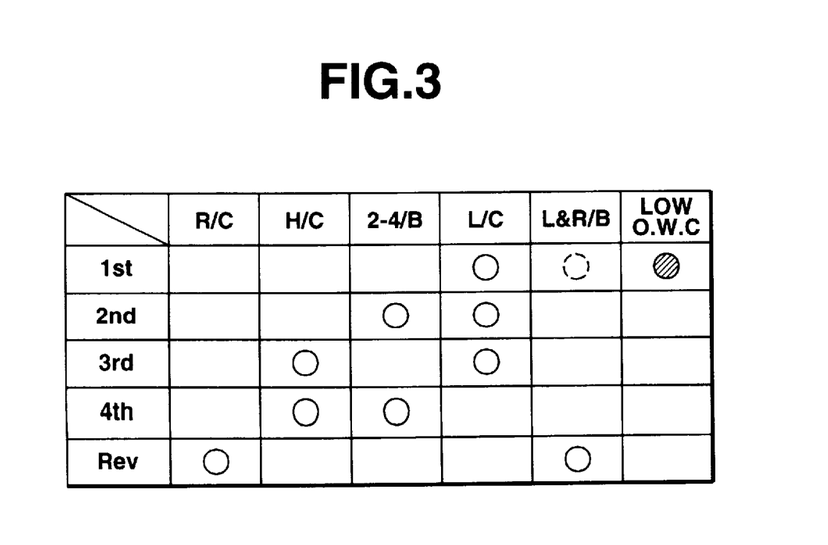
FIG. 3 is a table used in explaining the engaged and disengaged states of the friction elements illustrated in FIG. 2 to effect various gear ratio changes.

Each of the friction elements is switched between its engaged and disengaged states, as shown in FIG., 3, to provide four forward speeds and one reverse. In FIG. 3, the character 0 indicates that the corresponding friction element is engaged. The gear ratios are obtained as follows:

1st: The low clutch L/C is engaged and the low and reverse brake L&R/B is engaged to fix the second ring gear R2 when the engine brake range is selected or the one-way clutch LOW/C.W.C is engaged when the vehicle is accelerating so that the drive is transmitted from the input shaft IN to the second sun gear S2 and, in turn, through the second pinion carrier C2 to the output shaft OUT.

2nd: The low clutch L/C is engaged and the 2–4 brake 2–4/B is engaged to fix the first sun gear S1 so that the drive is transmitted from the input shaft IN to the second sun gear S2 and in turn through the second pinion carrier C2 to the output shaft OUT.

3rd: The high clutch H/C is engaged and the low clutch L/C is engaged so that the drive is transmitted from the input shaft IN to the second ring and sun gears R2 and S2 and in turn through the second pinion carrier C2 to the output shaft OUT. In this case, a 1 to 1 ratio is given.

4th: The high clutch H/C is engaged and the 2–4 brake 2–4/B is engaged to fix the first sun gear S1 so that the drive is transmitted from the input shaft IN to the first pinion carrier C1 and also to the second sun gear S2 and in turn through the second pinion carrier C2 to the output shaft OUT. In this case, an overdrive (OD) ratio is given.

Reverse: The reverse clutch R/C is engaged and the low and reverse brake L&R/B is engaged to fix the first pinion carrier C1 so that the drive is transmitted from the input shaft IN to the first and second sun gears S1 and S2 and in turn through the second pinion carrier C2 to the output shaft OUT.

Figure 4:
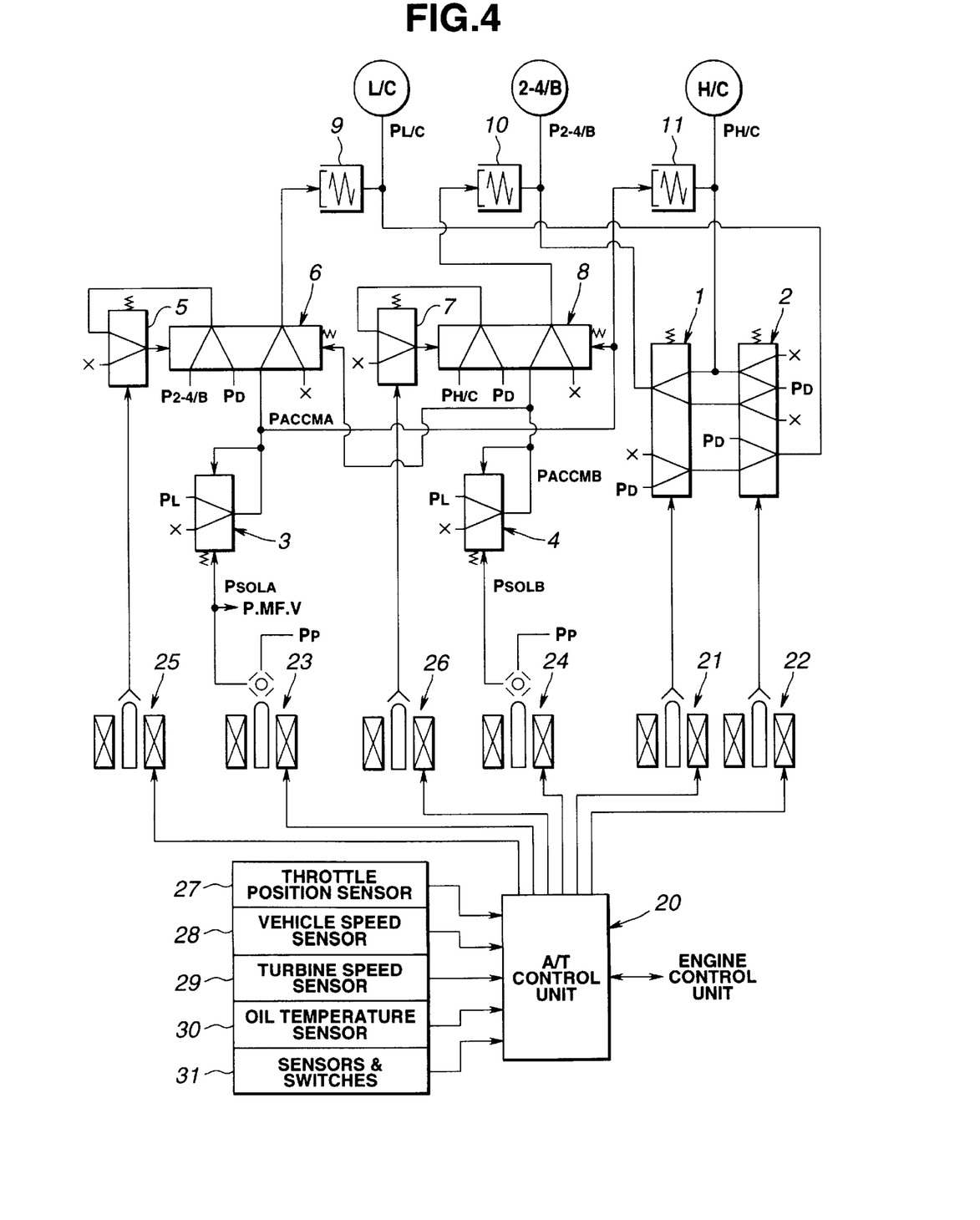
FIG. 4 is a schematic diagram showing the upshift control apparatus of the invention.

Referring to FIG. 4, there is shown a schematic diagram of a control system for operating the friction elements L/C, 2–4/B and H/C to provide 1st to 4th speeds when the drive (D) range is selected. The control system includes a first shift valve 1, a second shift valve 2, a first accumulator control valve 3, a second accumulator control valve 4, a low clutch timing valve 5, a low clutch sequence valve 6, a 2–4 brake timing valve 7, a 2–4 brake sequence valve 8, a low clutch accumulator 9, a 2–4 brake accumulator 10 and a high clutch accumulator 11. First and second shift solenoids 21 and 22 are provided to operate the first and second shift valves 1 and 2, respectively, for fluid (pressure oil) passage selection in a manner to provide one of the 1st, 2nd, 3rd and 4th gear ratio. The first accumulator control valve 3 operates to decrease the line pressure PL, according to the solenoid pressure PSOLA determined by a line pressure duty solenoid 23, so as to adjust the accumulator control pressure PACCMA. The solenoid pressure PSOLA determined by the line pressure duty solenoid 23 is also applied to a pressure modifier valve for adjusting the modifier pressure used as a signal pressure for the line pressure PL produced from a pressure regulator valve. The second accumulator control valve 4 operates to decrease the line pressure PL, according to the solenoid pressure PSOLB determined by a 2–4/B duty solenoid 24, so as to adjust the accumulator control pressure PACCMB. The low clutch timing valve 5 is operated, by a low clutch timing solenoid 25, to connect the signal pressure passage to its drain port when the low clutch timing solenoid 25 is OFF and to its outlet port connected to the low clutch sequence valve 6 when the low clutch timing solenoid 25 is ON. The low clutch sequence valve 6 controls the back pressure to the low clutch accumulator 9 when an upshift to the 4th gear ratio or a downshift from the 4th gear ratio is commanded. The 2–4 brake timing valve 7 is operated, by a 2–4 brake timing solenoid 26, to connect the signal pressure passage to its drain port when the 2–4 brake timing solenoid 26 is OFF and to its outlet port connected to the 2–4 brake sequence valve 8 when the 2–4 brake timing solenoid 26 is ON. The 2–4 brake sequence valve 8 controls the back pressure to the 2–4 brake accumulator 10 when an upshift to the 3rd gear ratio or a downshift from the 3rd gear ratio is commanded. The low clutch accumulator 9 has a back pressure chamber for receipt of the accumulator control pressure PACCMA fed thereto through the low clutch sequence valve 4 to ensure smooth engagement and disengagement of the low clutch L/C. The 2–4 brake accumulator 10 has a back pressure chamber for receipt of the accumulator control pressure PACCMB fed thereto through the 2–4 brake sequence valve 8 to ensure smooth engagement and disengagement of the 2–4 brake 2–4/B. The high clutch accumulator 11 has a back pressure chamber for receipt of the accumulator control pressure PACCMA fed thereto to ensure smooth engagement and disengagement of the high clutch H/C.

Figure 5:
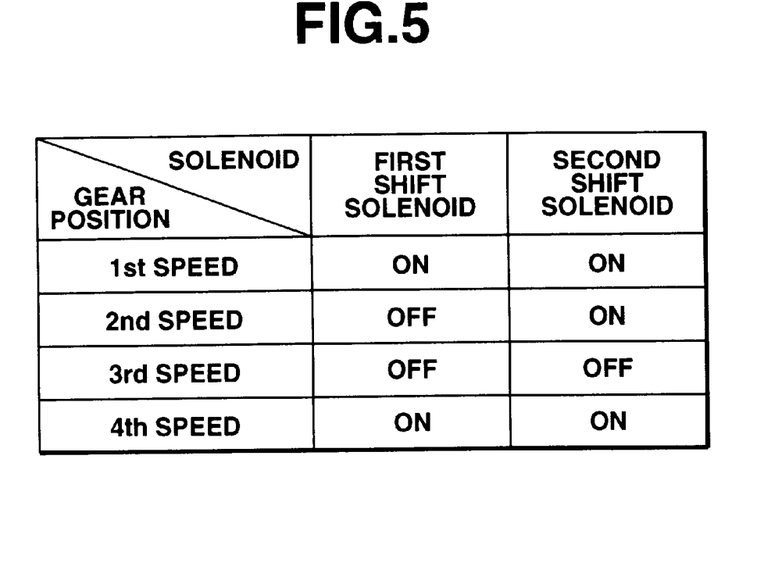
FIG. 5 is a table used in explaining the ON and OFF States of the first and second shift solenoids illustrated in FIG. 4 to effect various gear ratio changes.
Figure 6:
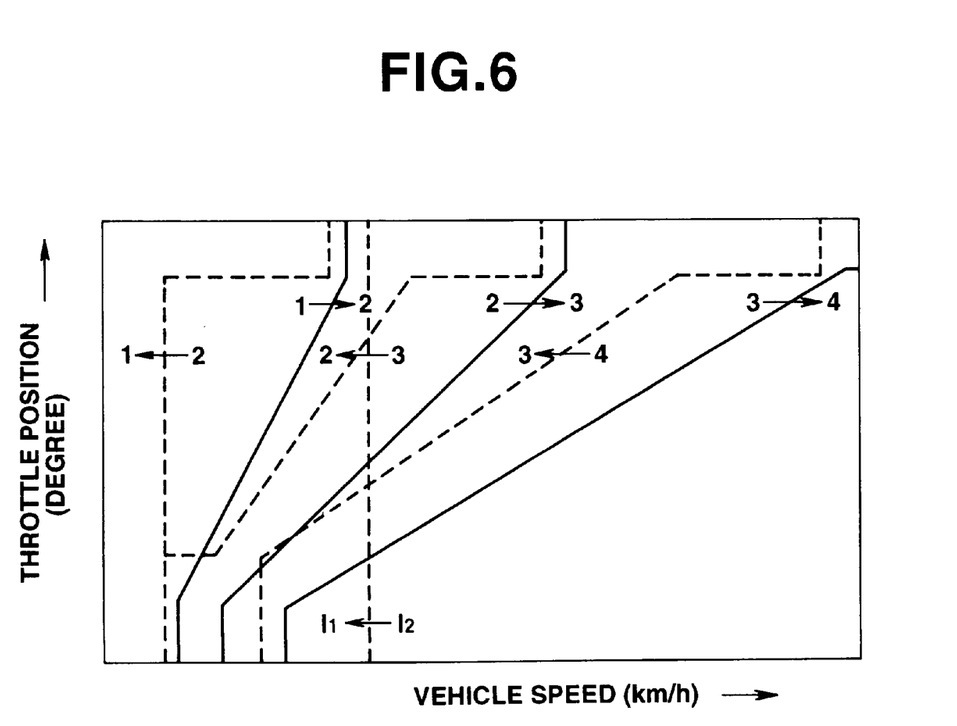
FIG. 6 is a diagram showing a shift schedule used for a shift control made in the shift control apparatus of FIG. 4.

An A/T control unit 20 is provided to control the actuators, that is, the first shift solenoid 21, the second shift solenoid 22, the line pressure duty solenoid 23, the 2–4 brake duty solenoid 24, the low clutch timing solenoid 25 and the 2–4 brake timing solenoid 26, to make a gear change in the automatic transmission A/T. The A/T control unit 20 effects gear changed based upon throttle position, vehicle speed, turbine speed, oil temperature and etc. Thus, a throttle position sensor 27, a vehicle speed sensor 28, a turbine speed sensor 29 and an oil temperature sensor 30 are connected to the A/T control unit 20. The numeral 31 designates the other sensors and switches connected to the A/T control unit 20. The throttle position sensor 27 is associated with the throttle valve provided in the engine for controlling the amount of air permitted to enter the engine and it produces a voltage signal indicated of the degree to which the throttle valve opens. The vehicle speed sensor 28 may be provided at a position for sensing the speed of rotation of the transmission output shaft and it produces a signal indicative of the speed of running of the vehicle. The turbine speed sensor 29 is provided to sense the speed of rotation of the turbine. The oil temperature sensor is provided for sensing the temperature of the fluid (pressure oil) used to operate the friction elements and it produces a signal indicative of the sensed oil temperature. In the illustrated embodiment, the A/T control unit 20 is arranged to make an automatic gear shift control to effect gear changes by switching ON and OFF states of the first and second shift solenoids 21 and 22, as shown in FIG. 5. For this purpose, the A/T control unit 20 employs a shift schedule table, as shown in FIG. 6, to produce an upshift command when the operation point represented by throttle valve position and vehicle speed crosses one of the upshift lines, as indicated by the solid lines of FIG. 6, and a downshift command when the operation point crosses one of the downshift lines, as indicated by the broken lines of FIG. 6. The A/T control unit 20 switches the first and second shift solenoids 21 and 22 to effect a change to the gear position determined by the upshift or downshift command.

The A/T control unit 20 employs a digital computer which includes a central processing unit (CPU), a random access memory (RAM), a read only memory (ROM), and an input/output control unit (I/O). The central processing unit communicates with the rest of the computer via data bus. The input/output control unit includes an analog-to-digital converter which receives analog signals from the various sensors and it converts the received signal into corresponding digital signals for application to the central processing unit. The read only memory contains the programs for operating the central processing unit and further contains appropriate data in look-up tables used for gear shift control.

Figure 7:
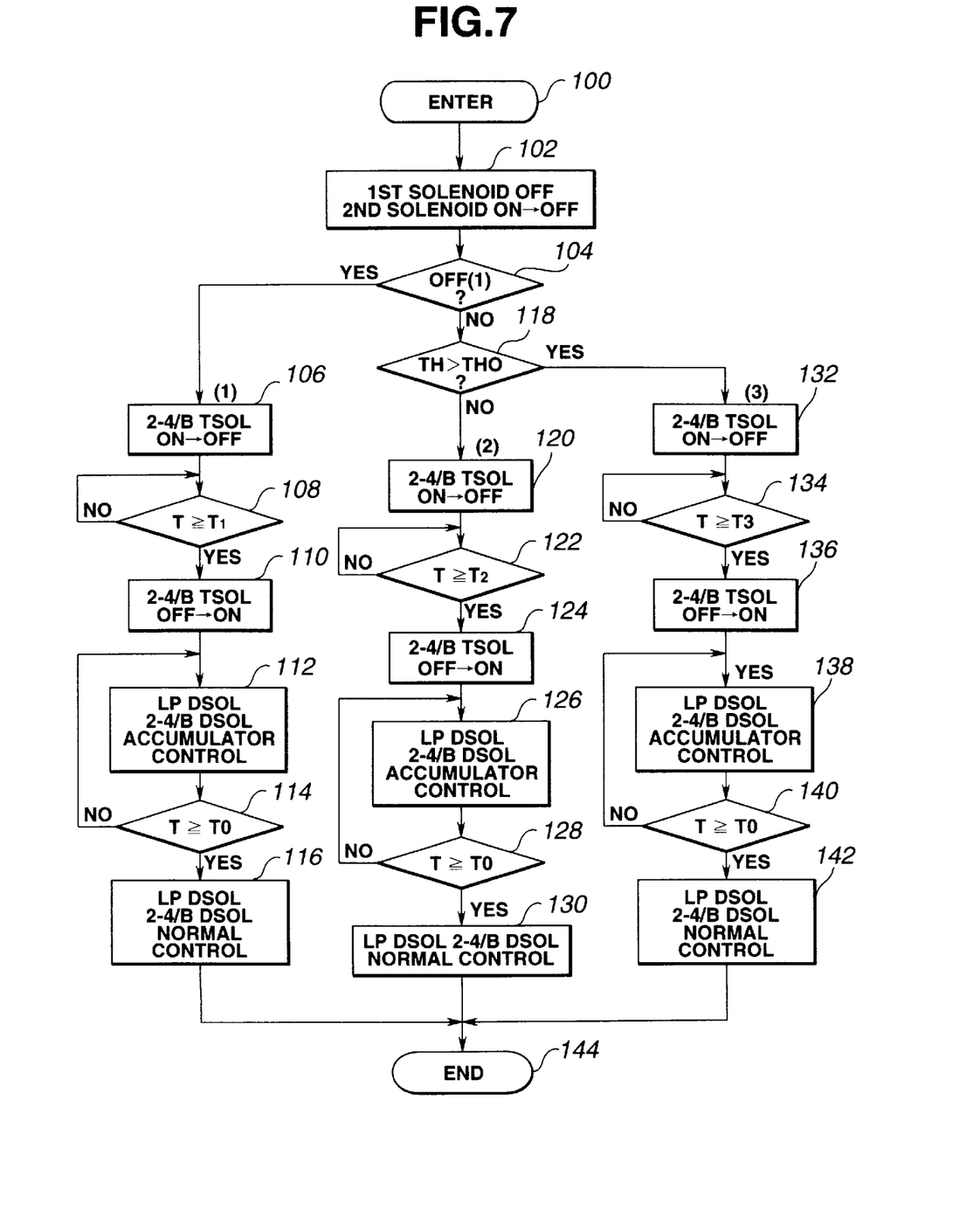
FIG. 7 is a flow diagram illustrating the programming of the digital computer as it is used for a 2–3 upshift control.

FIG. 7 is a flow diagram illustrating the programming of the digital computer as it is used to effect a 2–3 upshift. The computer program is entered at the point 100 when a 2–3 upshift command is produced, that is, when the operation point crosses the 2–3 upshift line (FIG. 6). The 2–3 upshift is effected by releasing the 2–4 brake 2–4/B (first friction element) and engaging the high clutch H/C (second friction element). When the 2–3 upshift command is produced, information including throttle position TH and the like required for the shift control is read and a timer is started to count clock pulses. The count T of the timer corresponds to the time elapsed after the 2–3 upshift command is produced. At the point 102 in the program, the command signal to be applied to the first shift solenoid 21 is held at its OFF state and the command signal to be applied to the second shift solenoid 22 is switched from its ON state to its OFF state. At the point 104, a determination is made as to whether or not the accumurator back pressure control is required to be made in a power-off mode OFF(1). This determination is made based on the sensed throttle valve position TH. If the throttle valve position TH is at zero or at a very small angle close to zero, then the answer to this question is "YES" and the program proceeds to the point 106. Otherwise, it means that the accumurator back pressure control is required to be made in a power-on mode and the program proceeds to the point 118.

At the point 106 in the program, a command signal (2–4/BTSOL) to the 2–4 brake timing solenoid 26 is changed from its ON state to its OFF state. At the point 108, a determination is made as to whether or not the count T of the timer is equal to or greater than a first reference value T1. The first reference value T1 is set at a value somewhat shorter than the time required for the stroke of the piston 15 of the high clutch H/C. If the answer to this question is "YES", then the program proceeds to the point 110. Otherwise, the program is returned to the point 108. At the point 110, the command signal (2–4/BTSOL) to the 2–4 brake timing solenoid 26 is changed from its OFF state to its ON state. At the point 112, commands are produced to control the line-pressure and 2–4 brake duty solenoids 23 and 24 in an accumulator control mode to be described later in more detail. At the point 114, a determination is made as to whether or not the count T of the timer is equal to or greater than a predetermined value TO. If the answer to this question is "YES", then it means that the gear shift has been completed and the program proceeds to the point 116. Otherwise, the program is returned to the point 112. At the point 116, a command is produced to return the control from the accumulator control mode to the normal mode. It is to be noted that an ON command is outputted to the low clutch timing solenoid 25. Following this, the program proceeds to the end point 144.

At the point 118, a determination is made as to whether or not the throttle valve position TH is less than a small value THO, for example THO=1/16. If the answer to this question is "NO", then it means that the accumurator back pressure control is required to be made in a low-throttle power-on mode ON(2) and the program proceeds to the point 120. Otherwise, it means that the accumurator back pressure control is required to be made in a high-throttle power-on mode ON(3) and the program proceeds to the point 132.

At the point 120 in the program, a command signal (2–4/BTSOL) to the 2–4 brake timing solenoid 26 is changed from its ON state to its OFF state. At the point 122, a determination is made as to whether or not the count T of the timer is equal to or greater than a second reference value T2. The second reference value T2 is set at a value somewhat longer than the time required for the stroke of the piston of the high clutch H/C. It can be seen from a study of FIG. 10 that the determination at the point 122 may be replaced with a determination as to whether or not the detected gear ratio G is equal to or greater than a gear ratio G' detected at the start of the upshift. If the answer to this question is "YES", then the program proceeds to the point 124. Otherwise, the program is returned to the point 122. At the point 124, the command signal (2–4/BTSOL) to the 2–4 brake timing solenoid 26 is changed from its OFF state to its ON state. At the point 126, commands are produced to control the line-pressure and 2–4 brake duty solenoids 23 and 24 in an accumulator control mode to be described later in more detail. At the point 128, a determination is made as to whether or not the count T of the timer is equal to or greater than the predetermined value T0. If the answer to this question is "YES", then it means that the upshift has been completed and the program proceeds to the point 130. Otherwise, the program is returned to the point 126. At the point 130, a command is produced to return the control from the accumulator control mode to the normal mode. It is to be noted that an ON command is outputted to the low clutch timing solenoid 25. Following this, the program proceeds to the end point 144.

At the point 132 in the program, a command signal (2–4/BTSOL) to the 2–4 brake timing solenoid 26 is changed from its ON state to its OFF state. At the point 134, a determination is made as to whether or not the count T of the timer is equal to or greater than a third reference value T3. The third reference value T3 is set at a value somewhat shorter than the time required for the stroke of the piston of the high clutch H/C. If the answer to this question is "YES", then the program proceeds to the point 136. Otherwise, the program is returned to the point 134. At the point 136, the command signal (2–4/BTSOL) to the 2"4 brake timing solenoid 26 is changed from its OFF state to its ON state. At the point 138, commands are produced to control the line-pressure and 2–4 brake duty solenoids 23 and 24 in an accumulator control mode to be described later in more detail. At the point 140, a determination is made as to whether or not the count T of the timer is equal to or greater than the predetermined value TO. If the answer to this question is "YES", then it means that the upshift has been completed and the program proceeds to the point 142. Otherwise, the program is returned to the point 138. At the point 142, a command is produced to return the control from the accumulator control mode to the normal mode. It is to be noted that an ON command is outputted to the low clutch timing solenoid 25. Following this, the program proceeds to the end point 144.

Figure 8A:
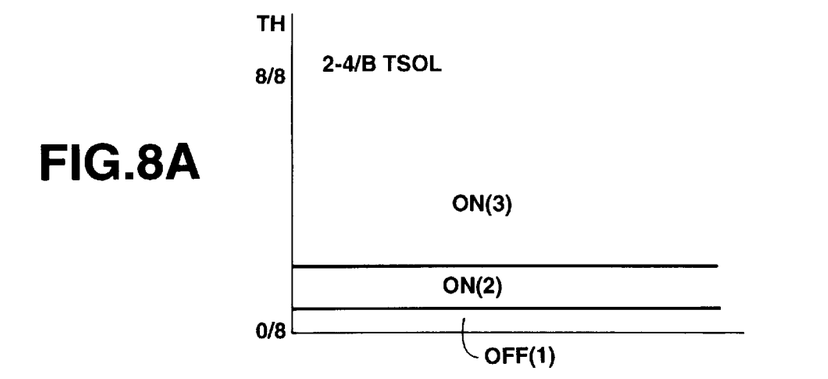
FIG. 8A, 8B, 8C and 8D show several examples of table used to determine a desired one of the back pressure control modes.
Figure 8B:
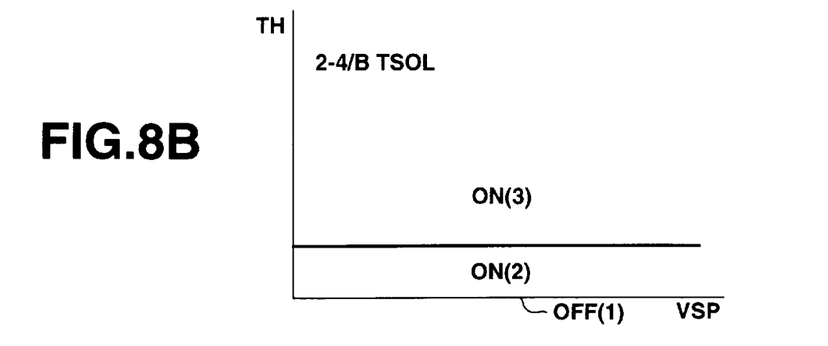
Figure 8C:
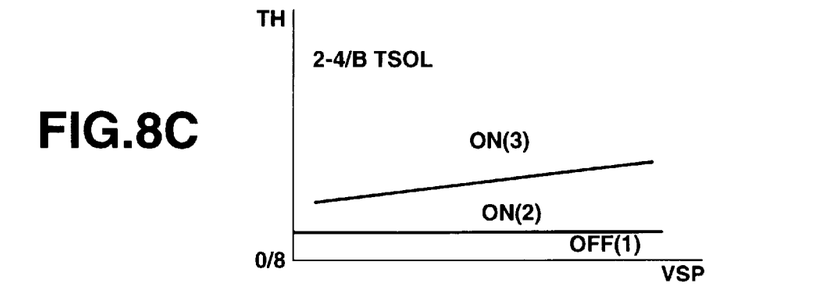
Figure 8D:
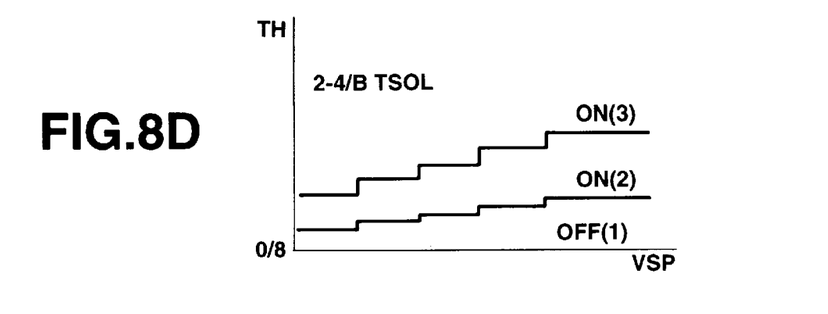

Although which one of the power-off and power-on modes is required and which one of the low-throttle and high-throttle power-on modes is required are determined separately in the determination steps at the points 104 and 118, it is to be understood that these determinations may be made in a single determination step with the use of a table programmed into the digital computer. FIGS. 8A to 8D show several examples of such a table. FIGS. 8A and 8B show such tables each of which defines a desired one of the accumurator back pressure control modes OFF(1), ON(2) and ON(3) as a function of throttle valve position TH. FIGS. 8C and 8D show such tables each of which defines a desired one of the accumurator back pressure control modes OFF (1), ON(2) and ON(3) as a function of throttle valve position TH and vehicle speed VSP.

When a 2–3 upshift command is produced, the command to the second shift solenoid 22 is changed from its ON state to its OFF state so as to change the second shift solenoid 22 from its ON position to its ON position. As a result, connection of the high clutch H/C is changed from the drain to the D range pressure source, whereas the connection of the 2–4 brake 2–4/B is changed from the D range pressure source to the drain. During transition of the 2–3 upshift operation, the pressures to the high clutch H/C and the 2–4 brake 2–4/B are controlled by controlling the respective accumulator back pressures. The accumulator back pressure for the high clutch H/C is controlled by the line pressure duty solenoid 23 provided to produce an accumulator control pressure PACCMA. The accumulator back pressure for the 2–4 brake 2–4/B is controlled by the 2–4 brake duty solenoid 24 provided to produce an accumulator control pressure PACCMB and the 2–4 brake timing solenboid 26 provided to change the position of the 2–4 brake timing valve 7.

Figure 9:
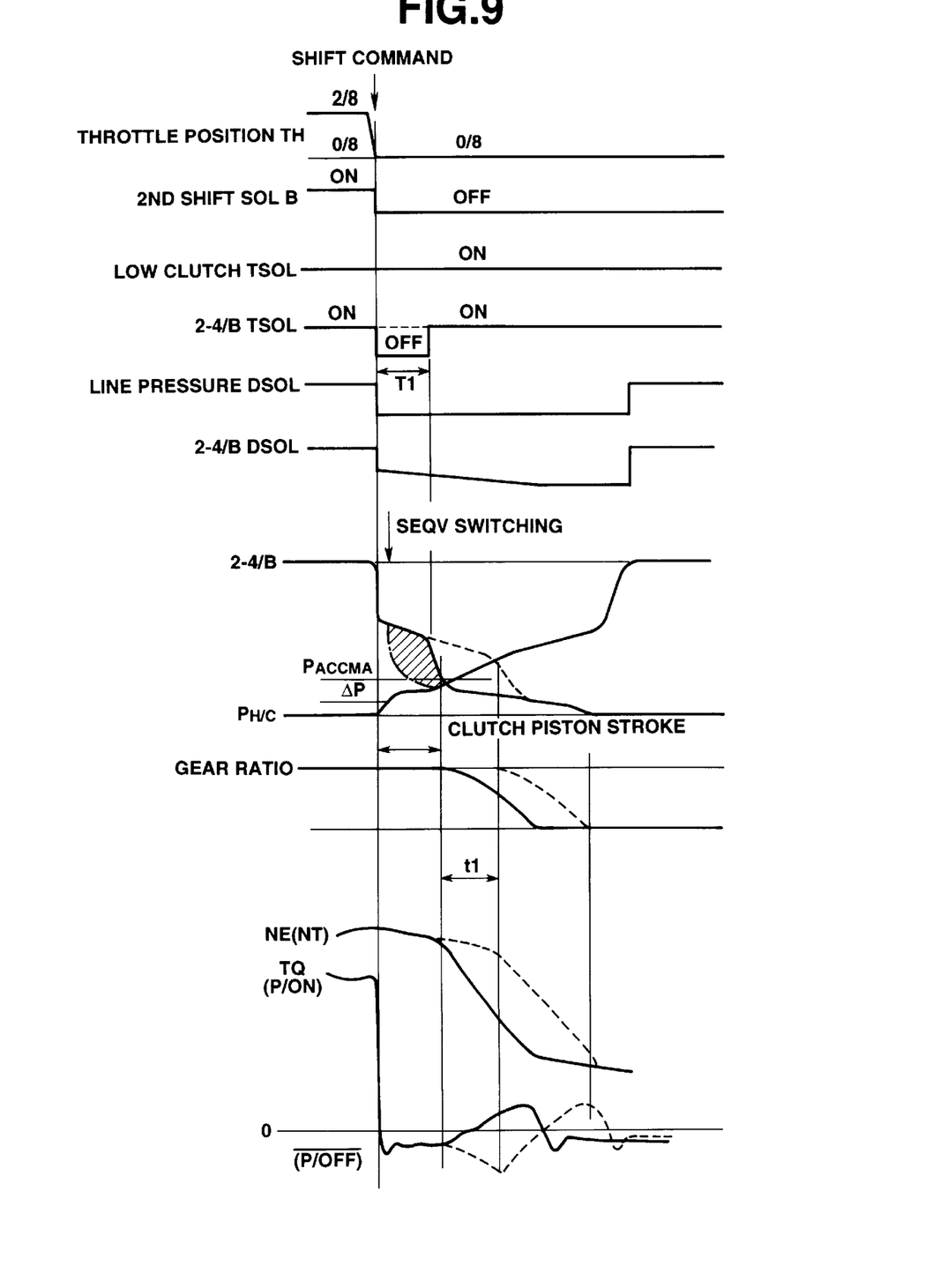
FIG. 9 contains graphs showing the transient characteristics of various conditions during a 2–3 upshift effected with the power-off back pressure control mode.

Referring to FIG. 9, the power-off mode OFF(1) of the accumulartor back pressure control will be described further.

When an 2–3 upshift is commanded with the accelerator pedal being released from its depressed position (TH: 2/8 →0/8) or held released (TH: 0/8 →0/8), the high clutch pressure P/HC (apply pressure) increases according to a shelf pressure characteristic, as shown in FIG. 9, under the accumulator back pressure control for the high clutch H/C, whereas the 2–4 brake pressure P2–4/B (release pressure) exhibits a shelf pressure characteristic from a time interval, extending from the time at which the upshift is commanded to the first time T1, during which a sufficient back pressure is retained and then drops at a rapid rate because of back pressure draining, as shown in FIG. 9, under the accumulator back pressure control for the 2–4 brake 2–4/B.

The accumulator back pressure control for the 2–4 brake 2–4/B is made as follows: During the interval between the time at which the 2–3 upshift is commanded and the time at which the count T of the timer reaches the first reference value T1, an OFF command is produced temporarily to place the 2–4 brake timing solenoid 26 to its OFF position causing the 2–4 brake timing valve 7 to make a connection to the drain therethrough. As a result, the 2–4 brake sequence valve 8 is supplied with no working signal pressure and it holds a connection to the back pressure source therethrough so that the 2–4 accumulator 10 is supplied with the accumulator control pressure PACCMB. When the time T1 is elapsed after the 2–3 upshift is commanded, an ON command is produced to place the 2–4 brake timing solenoid 26 to its ON position causing the 2–4 brake timing valve 7 to make a connection to the working signal pressure source therethrough. As a result, the 2–4 brake sequence valve 8 is supplied with a working signal pressure (high clutch pressure PH/C) and it changes its position to make a connection to the drain therethrough so as to drain the back pressure from the 2–4 accumulator 10. Since the 2nd speed continues and the 2–4 brake 2–4/B is held engaged during the time T1 after the 2–3 upshift is commanded, it is possible to prevent engine racing even though the accelerator pedal is depressed just after the 2–3 upshift is commanded.

If an ON command, rather than the OFF command, is produced to the 2–4 brake timing solenoid 26 when the 2–3 upshift is commanded, a working signal pressure will be applied to the 2–4 brake sequence valve 8 which thereby makes a change to its position draining the back pressure so as to decrease the 2–4 brake pressure P2–4/B at a rapid rate, as indicated by the one-dotted curve of FIG. 19, just after the 2–3 upshift is commanded. As a result, almost no torque capacity is provided with the 2–4 brake pressure P2–4/B and the high clutch pressure PH/C like the case where the neutral position is selected. In this case, engine racing will occur when the accelerator pedal is depressed just after the 2–3 upshift is commanded.

After the time T1 has been elapsed, the 2–4 brake pressure P2–4/B decreases at a rapid rate to progress the 2–3 upshift with an early gear ratio change. The engine speed NE decreases at a grate rate and the transmitted torque TQ increases at a small rate with changing gear ratio and then decreases to some extent. It is, therefore, possible to effect a crisp 2–3 upshift having a high shift quality with no torque drop. That is, when the accumulartor back pressure control is made in the power-off mode OFF(1), no engine racing occurs even though the position of the 2–4 brake sequence valve 8 is changed. If the 2–4 brake sequence valve 8 is fixed at the position making the connection to the drain with an inhibition against a change to the other position, the 2–4 brake pressure P2–4/B will change, as indicated by the dotted curve of FIG. 9, so that the engine speed NE decreases with a delay of time t1, the transmitted torque TQ drops and the gear ratio decreases with a delay. This results in an undesirable feel of a slow-footed upshift to the operator.

Figure 10:
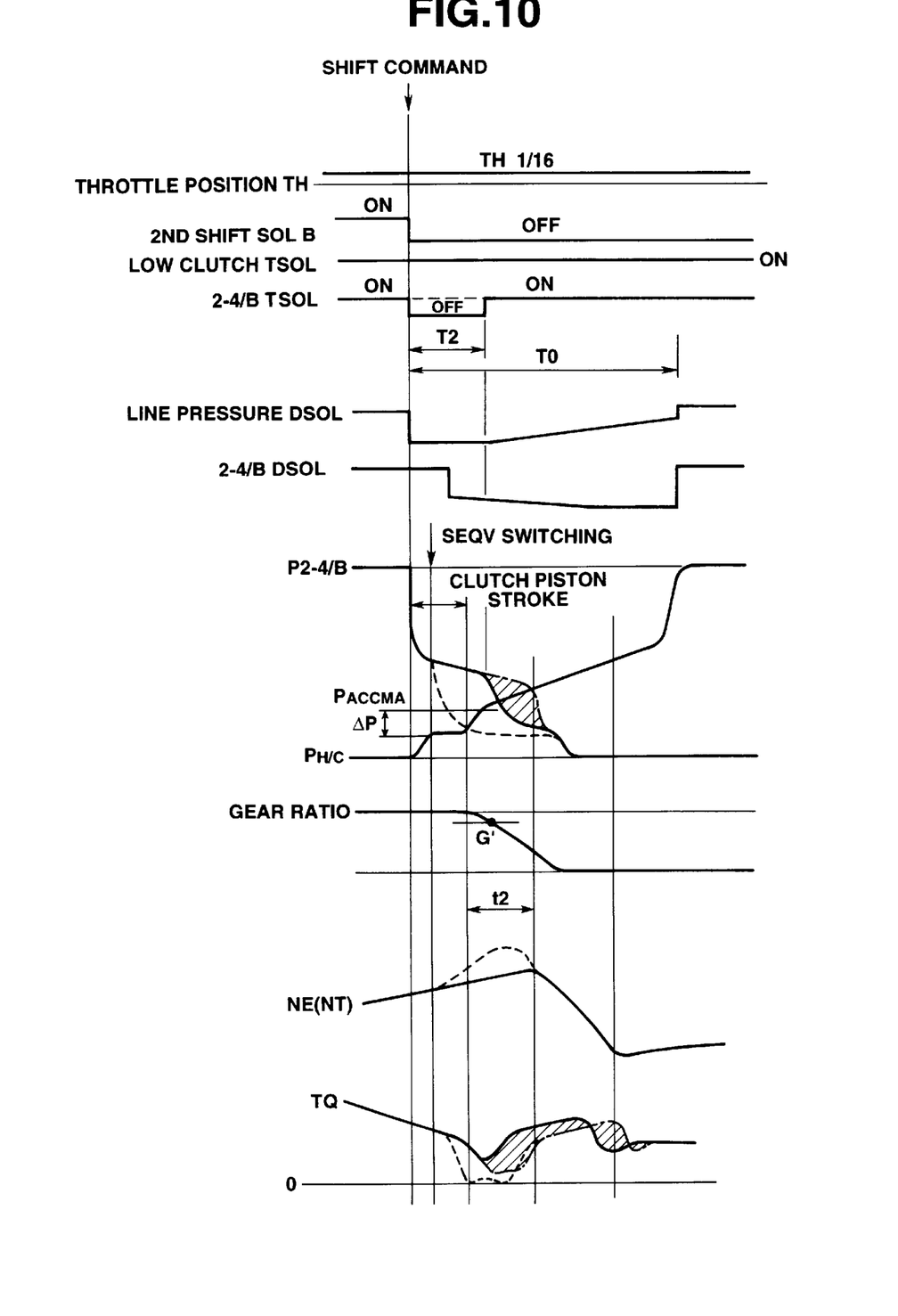
FIG. 10 contains graphs showing the transient characteristics of various conditions during a 2–3 upshift effected with the low-throttle power-on back pressure control mode.

Referring to FIG. 10, the low-throttle power-on mode ON(2) of the accumulartor back pressure control will be described further. When an 2–3 upshift is commanded with the accelerator pedal being held depressed to a small extent (TH: 1/16 →1/16), the high clutch pressure P/HC (apply pressure) exhibits a shelf pressure characteristic, as shown in FIG. 10, under the accumulator back pressure control for the high clutch H/C, whereas the 2–4 brake pressure P2–4/B (release pressure) exhibits a shelf pressure characteristic from a time interval, extending from the time at which the upshift is commanded to the second time T2, during which a sufficient back pressure is retained and then drops at a rapid rate because of back pressure draining, as shown in FIG. 10, under the accumulator back pressure control for the 2–4 brake 2–4/B.

The accumulator back pressure control for the 2–4 brake 2–4/B is made as follows: During the interval between the time at which the 2–3 upshift is commanded and the time at which the count T of the timer reaches the second reference value T2, an OFF command is produced temporarily to place the 2–4 brake timing solenoid 26 to its OFF position causing the 2–4 brake timing valve 7 to make a connection to the drain therethrough. As a result, the 2–4 brake sequence valve 8 is supplied with no working signal pressure and it holds a connection to the back pressure source therethrough so that the 2–4 accumulator 10 is supplied with the accumulator control pressure PACCMB. When the time T2 is elapsed after the 2–3 upshift is commanded, an ON command is produced to place the 2–4 brake timing solenoid 26 to its ON position causing the 2–4 brake timing valve 7 to make a connection to the working signal pressure source therethrough. As a result, the 2–4 brake sequence valve 8 is supplied with a working signal pressure (high clutch pressure PH/C) and it changes its position to make a connection to the drain therethrough so as to drain the back pressure from the 2–4 accumulator 10. Since the 2–4 brake 2–4/B is held engaged during the time T2 after the 2–3 upshift is commanded and then a control is made to change the 2–4 brake 2–4/B toward its released condition after the time T2 has been elapsed, it is possible to ensure a good shift quality without engine racing as compared to the solenoid ON control where the 2–4 brake sequence valve 8 is allowed to change its position. If the 2–4 brake sequence valve 8 is allowed to change its position, it will be changed to the position making a connection to the drain at an early time before the piston stroke is completed, as indicated by the broken curve of FIG. 10, so as to release both of the 2–4 brake 2–4/B and the high clutch H/C (in a neutral condition). As a result, the engine races to produce a torque drop in the interval t2 between the time at which the clutch piston stroke is completed and the time at which the high clutch H/C has a torque capacity. It is also possible to prevent the time during which a shock resulting from a torque drop continues from being elongated as compared to the solenoid OFF control where the 2–4 brake sequence valve 8 is prevented from changing its position so as to retain the back pressure. If the 2–4 brake sequence valve 8 is prevented from changing its position so as to retain the back pressure, the release pressure of the 2–4 brake 2–4/B cannot decrease until the high clutch H/C has a torque capacity, as indicated by the one-dotted curve of FIG. 10. It is, therefore, possible to suppress an increase in the engine speed NE which may result from engine racing and also a drop in the transmitted torque TQ. However, the time required for the upshift is elongated so that the shock, which results from the torque drop, continues for an elongated time, as indicated by the one-dotted curve of FIG. 10. According to the invention, the back pressure control is changed from the solenoid OFF control mode to the solenoid ON control mode after the time 2 so as to prevent engine racing and also a shock resulting from a torque drop.

Figure 11:
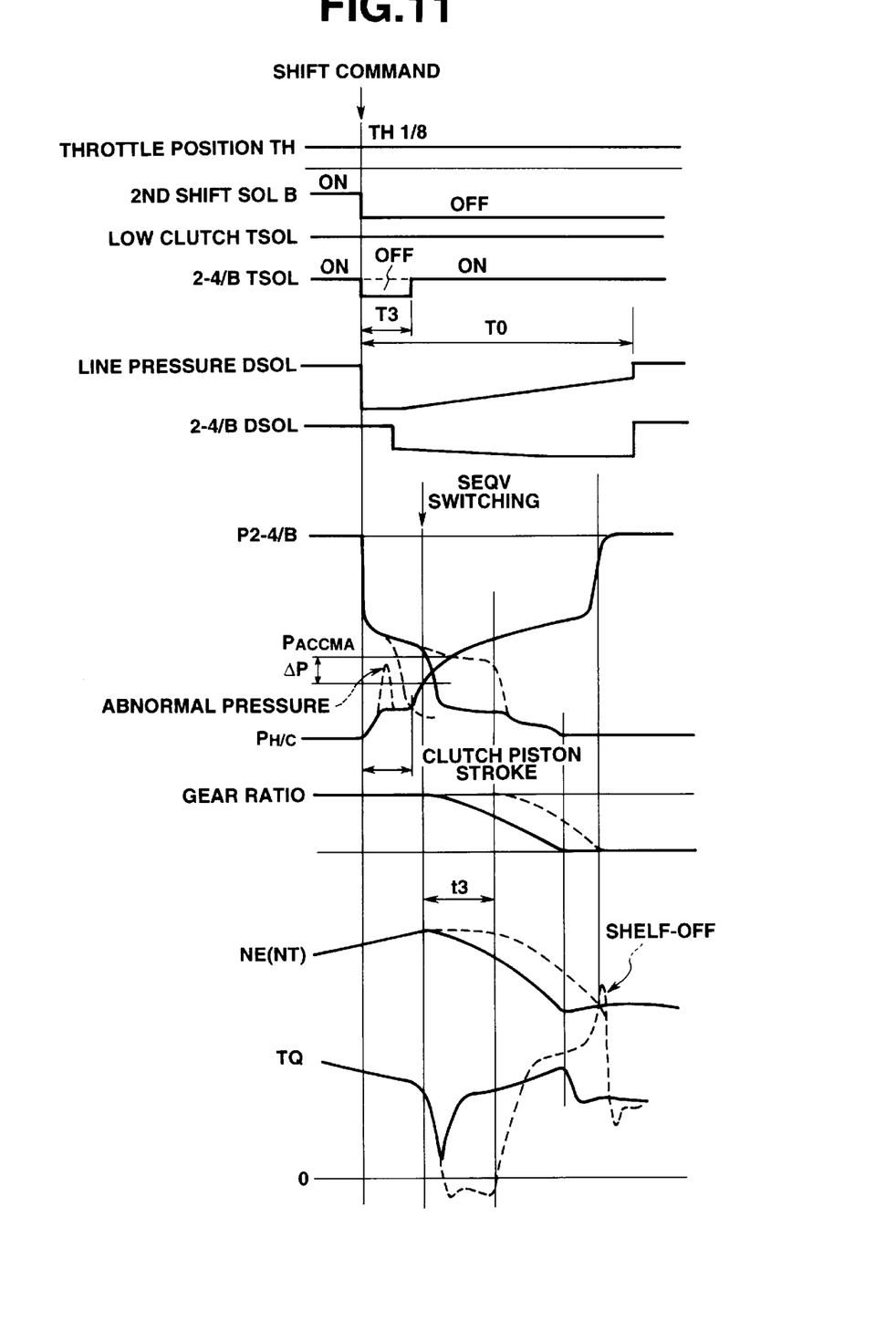
FIG. 11 contains graphs showing the transient characteristics of various conditions during a 2–3 upshift effected with the high-throttle power-on back pressure control mode.

Referring to FIG. 11, the high-throttle power-on mode ON(3) of the accumulartor back pressure control will be described further. When an 2–3 upshift is commanded with the accelerator pedal being held depressed (TH: 1/8 →1/8), the high clutch pressure P/HC (apply pressure) exhibits a shelf pressure characteristic, as shown in FIG. 11, under the accumulator back pressure control for the high clutch H/C, whereas the 2–4 brake pressure P2–4/B (release pressure) exhibits a shelf pressure characteristic from a time interval, extending from the time at which the upshift is commanded to the time at which the 2–4 brake sequence valve 8 changes its position, during which a sufficient back pressure is retained and then drops at a rapid rate because of back pressure draining, as shown in FIG. 11, under the accumulator back pressure control for the 2–4 brake 2–4/B.

During the interval between the time at which the 2–3 upshift is commanded and the time at which the count T of the timer reaches the third reference value T3, an OFF command is produced temporarily to place the 2–4 brake timing solenoid 26 to its OFF position causing the 2–4 brake timing valve 7 to make a connection to the drain therethrough. As a result, the 2–4 brake sequence valve 8 is supplied with no working signal pressure and it holds a connection to the back pressure source therethrough so that the 2–4 accumulator 10 is supplied with the accumulator control pressure PACCMB. When the time T3 is elapsed after the 2–3 upshift is commanded, an ON command is produced to place the 2–4 brake timing solenoid 26 to its ON position causing the 2–4 brake timing valve 7 to make a connection to the working signal pressure source therethrough. As a result, the 2–4 brake sequence valve 8 is supplied with a working signal pressure (high clutch pressure PH/C) and it changes its position to make a connection to the drain therethrough so as to drain the back pressure from the 2–4 accumulator 10. Since the 2–4 brake 2–4/B is held engaged during the time T3 after the 2–3 upshift is commanded, an abnormal pressure, which may be produced when the piston is caught, or a temporary increase in the inner pressure of the control valve above the clutch terminal pressure at a low temperature cannot change the 2–4 sequence valve to decrease the 2–4 brake pressure P2–4/B during the stroke of the piston of the high clutch H/C. That is, if the 2–4 brake sequence valve 8 is allowed to change its position with an ON command outputted to the 2–4 brake timing solenoid 26 during shifting, the 2–4 brake sequence valve 8 may operate in error to decrease the 2–4 brake pressure P2–4/B in an early time, causing engine racing when an abnormal pressure is produced during the stroke of the piston of the high clutch H/C.

When the time T3 is elapsed after the 2–3 upshift is commanded, an ON command is produced to place the 2–4 brake timing solenoid 26 to its ON position causing the 2–4 brake timing valve 7 to make a connection to the source of the working signal pressure (high clutch pressure PH/C) therethrough. As a result, the 2–4 brake sequence valve 8 is changed from the position supplying the accumulator control pressure PACCMB to the 2–4 accumulator 10 to the position connecting it to the drain when the difference A P between the accumulator control pressure PACCMA and the high clutch pressure PH/C reaches a predetermined value.

That is, since the accumulator control pressure PACCMA has a value corresponding to the throttle valve position TH when the throttle valve position TH is not at a small angle during the power-on mode, the difference ΔP reaches the predetermined value, causing the back pressure from the 2–4 brake accumulator 10 to be drained after the clutch piston stroke is completed. Thus, the gear ratio decreases at an appropriate time just after the clutch piston stroke is completed as the 2–4 brake pressure P2–4/B decreases to progress the 2–3 upshift. The engine speed NE decreases as the 2–4 brake pressure P2–4/B decreases. Although the transmitted torque TQ decreases temporarily just after the position of the 2–4 brake sequence valve 8 is changed, the torque decrease is small. It is, therefore, possible to effect an upshift having a high shift quality by changing the position of the 2–4 brake sequence valve 8. That is, if the change of the position of the 2–4 brake sequence valve 8 is inhibited for a time longer than the time required for the piston stroke during a 2–3 upshift controlled in the high-throttle power-on mode, the decrease in the release shelf pressure of the 2–4 brake pressure P2–4/B is delayed a time t3 after the position of the 2–4 brake sequence valve 8 is changed, as indicated by the broken curve of FIG. 11. During the time t3, the engine speed NE increases to produce a drop in the transmitted torque TQ. Under certain conditions, the time at which the upshift may be completed after the end of the accumulator shelf pressure to cause a "shelf-off" shock. If the 2–4 brake sequence valve 8 is held allowed to change its position, the sequence valve will change to the position making a connection to the drain therethrough, causing engine racing in the presence of an abnormal pressure, as indicated by the one-dotted curve of FIG. 11.

The above described upshift control apparatus provides the following development advantages: First, the 2–4 brake sequence valve 8 is in a position connecting the back pressure of the 2–4 brake accumulator 10 to a pressure source. The 2–4 brake sequence valve operates on a pressure difference ΔP between the accumulator control pressure PACCMA and the high clutch pressure PH/C to change its position so as to connect the back pressure of the 2–4 brake accumulator 10 to the drain when the pressure difference ΔP reaches a predetermined value. When the back pressure control is made in the power-off control mode, the 2–4 brake timing valve 7 is changed to its position making a connection to the drain therethrough temporarily for a first time T1 somewhat shorter than the time required for the stroke of the piston of the high clutch H/C after the 2–3 upshift is commanded and then the 2–4 brake timing valve 7 is changed to its position making a connection of the high clutch pressure PH/C (working signal pressure) to the 2–4 brake sequence valve 26. It is, therefore, possible to effect a 2–3 upshift without engine racing which may occur when the accelerator pedal is depressed at the start of the 2–3 upshift operation. Furthermore, the 2–3 upshift is effected with no torque drop and without providing a feeling of slow shifting to the operator. Secondly, when the back pressure control is made in the low-throttle power-on control mode, the 2–4 brake timing valve 7 is changed to its position making a connection to the drain therethrough temporarily for a time T2 somewhat longer than the time required for the stroke of the piston of the high clutch H/C after a 2–3 upshift is commanded and then the 2–4 brake timing valve 7 is changed to the position making a connection of the high clutch pressure PH/C (working signal pressure) to the 2–4 brake sequence valve 8. It is, therefore, possible to prevent the time of the shock resulting from a torque drop from being elongated while ensuring a good shift quality without engine racing during the 2–3 upshift operation. Thirdly, when the back pressure control is made in the high-throttle power-on control mode, the 2–4 brake timing valve is changed to its position making a connection to the drain therethrough temporality for a time T3 somewhat shorter than the time required for the stroke of the piston of the high clutch H/C after a 2–3 upshift is commanded and then the 2–4 brake timing valve 7 is changed to the position making a connection of the high clutch pressure PH/C (working signal pressure) to the 2–4 brake sequence valve 8. It is, therefore, possible to prevent a shock resulting from a torque drop or "shelf-off" while preventing engine racing during the 2–3 upshift operation.

While the invention has been described in connection with a 2–3 upshift, it is to be understood that the invention is also applicable to a 3–4 upshift effected by releasing the low clutch L/C and engaging the 2–4 brake 2–4/B. In this case, the low clutch sequence valve 6 (accumulator back pressure control valve) controls the back pressure of the low clutch accumulator 9. When the automatic transmission is designed to provide five forward speeds, the invention is applicable to a 4–5 upshift effected in the automatic transmission. While the -invention has been described in connection with a system having two duty solenoids, that is, the line pressure duty solenoid 23 and the 2–4 brake duty solenoid 24, it is to be understood that the invention is also applicable to a system having at least one duty solenoid for controlling the accumulator pressure. While the invention has been described in connection with D range positions, it is to be understood that the invention is also applicable to another manual range position. In this case, the threshold valve (for example, THO) used to determine the low-throttle engine load range is set to provide a wider low-throttle engine load range for the manual range position. While the invention has been described in connection with the engine load sensor taken in the form of a throttle valve position sensor, it is to be understood that the engine load sensor may be an engine manifold pressure sensor. It is to be understood that the determination which one of the power-on or power-off modes is required may be made based on throttle valve position, vehicle speed, engine speed, turbine speed, oil temperature, gear position, range position, intake airflow and the like singly or in combination.

The invention is directed to an upshift control apparatus for use with an automotive vehicle having an engine, an accelerator and an automatic transmission having a first fiction element operable between engaged and released positions on a fluid pressure applied thereto through a first passage and a second friction element operable between engaged and released positions on a fluid pressure applied thereto through a second passage for controlling the fluid pressures to change the first friction element from the engaged position to the released position and the second friction element from the released position to the engaged position so as to effect an upshift from a current gear ratio to a higher target gear ratio.

According to the invention, the upshift control apparatus includes means for producing an upshift command signal when an upshift is commanded in the automatic transmission, means responsive to the upshift command signal for producing a power-on control signal when the accelerator is depressed and a power-off control signal when the accelerator is released, means for detecting engine load, an accumulator provided in the first fluid passage, the accumulator having a back pressure port through which a back pressure is applied thereto, a control valve having a first port connected to the back pressure port, a second port connected to a source of back pressure and a third port connected to a drain, the control valve being operable, between a first position connecting the first port to second port and a second position connecting the first port to the third port, on first and second working signal pressures applied thereto, the first working pressure being the fluid pressure applied through the second passage to the second friction element, the second working pressure corresponding to the detected engine load, the control valve being operable to change from the first position to the second position when a pressure difference between the first and second working signal pressures reaches a predetermined value, control means responsive to the power-off control signal for producing a valve control signal for a time somewhat shorter than a piston stroke time required for one stroke of a piston of the second friction element after the upshift command signal is produced, and means for preventing application of the first working signal pressure to the control valve in the presence of the valve control signal. Therefore, the upshift control apparatus can operate in a power-off back pressure control mode to effect an upshift without engine racing, which may occur when the accelerator pedal is depressed at the start of the upshift operation, a torque drop and a feeling of slow shifting to the operator.

Preferably, the control means includes means responsive to the power-on control signal for producing a low-load power-on control signal when the detected engine load is equal to or less than a predetermined engine load value, and means responsive to the low-load power-on control signal for producing the valve control signal for a time somewhat longer than the piston stroke time after the upshift command signal is produced. Therefore, the upshift control apparatus can operate in a low-load power-on back pressure control mode to prevent the time of the shock resulting from a torque drop from being elongated while ensuring a good shift quality without engine racing during the upshift operation.

Preferably, the control means includes means responsive to the power-on control signal for producing a high-load power-on control signal when the detected engine load is greater than the predetermined engine load value, and means responsive to the high-load power-on control signal for producing the valve control signal for a time somewhat shorter than the piston stroke time after the upshift command signal is produced. Therefore, the upshift control apparatus can operate in a high-load power-on back pressure control mode to prevent a shock resulting from a torque drop or "shelf-off" while preventing engine racing during the 2–3 upshift operation.

What is claimed is:

1. An upshift control apparatus for use with an automotive vehicle having an engine, an accelerator and an automatic transmission having a first fiction element operable between engaged and released positions on a fluid pressure applied thereto through a first passage and a second friction element operable between engaged and released positions on a fluid pressure applied thereto through a second passage for controlling the fluid pressures to change the first friction element from the engaged position to the released position and the second friction element from the released position to the engaged position so as to effect an upshift from a current gear ratio to a lower target gear ratio, comprising:

means for detecting engine load;

an accumulator provided in the first fluid passage, the accumulator having a back pressure port through which a back pressure is applied thereto;

a control valve having a first port connected to the back pressure port, a second port connected to a source of back pressure and a third port connected to a drain, the control valve being operable, between a first position connecting the first port to second port and a second position connecting the first port to the third port, on first and second working signal pressures applied thereto, the first working signal pressure being the fluid pressure applied through the second passage to the second friction element, the second working signal pressure corresponding to the detected engine load, the control valve being operable to change from the first position to the second position when a pressure difference between the first and second working signal pressures reaches a predetermined value; and a control unit for preventing application of the first working signal pressure to the control valve for a predetermined time after an upshift is commanded in the automatic transmission.

2. The upshift control apparatus as claimed in claim 1, wherein the control unit includes:

means for producing a power-off control signal when the upshift is commanded in the automatic transmission with the accelerator being released; and means responsive to the power-off control signal for producing a valve control signal for the predetermined time somewhat shorter than a piston stroke time required for one stroke of a piston of the second friction element; and means for preventing application of the first working signal pressure to the control valve in the presence of the valve control signal.

3. The upshift control apparatus as claimed in claim 1, wherein the control unit includes:

means for producing a power-on control signal when the upshift is commanded in the automatic transmission with the accelerator being depressed;

means responsive to the power-on control signal for producing a low-load power-on control signal when the detected engine load is equal to or less than a predetermined engine load value;

means responsive to the low-load power-on control signal for producing a valve control signal for the predetermined time somewhat longer than the piston stroke time; and means for preventing application of the first working signal pressure to the control valve in the presence of the valve control signal.

4. The upshift control apparatus as claimed in claim 1, wherein the control unit includes:

means for producing a power-on control signal when the upshift is commanded in the automatic transmission;

means responsive to the power-on control signal for producing a high-load power-on control signal when the detected engine load is greater than a predetermined engine load value;

means responsive to the high-load power-on control signal for producing a valve control signal for the predetermined time somewhat shorter than the piston stroke time; and means for preventing application of the first working signal pressure to the control valve in the presence of the valve control signal.

5. An upshift control apparatus for use with an automotive vehicle having an engine, an accelerator and an automatic transmission having a first fiction element operable between engaged and released positions on a fluid pressure applied thereto through a first passage and a second friction element operable between engaged and released positions on a fluid pressure applied thereto through a second passage for controlling the fluid pressures to change the first friction element from the engaged position to the released position and the second friction element from the released position to the engaged position so as to effect an upshift from a current gear ratio to a lower target gear ratio, comprising:

means for detecting engine load;

an accumulator provided in the first fluid passage, the accumulator having a back pressure port through which a back pressure is applied thereto;

a control valve having a first port connected to the back pressure port, a second port connected to a source of back pressure and a third port connected to a drain, the control valve being operable, between a first position connecting the first port to second port and a second position connecting the first port to the third port, on first and second working signal pressures applied thereto, the first working signal pressure being the fluid pressure applied through the second passage to the second friction element, the second working signal pressure corresponding to the detected engine load, the control valve being operable to change from the first position to the second position when a pressure difference between the first and second working signal pressures reaches a predetermined value;

means for producing a power-on control signal when the upshift is commanded in the automatic transmission with the accelerator being depressed;

means responsive to the power-on control signal for producing a low-load power-on control signal when the detected engine load is equal to or less than a predetermined engine load value;

means for detecting a gear ratio provided in the automatic transmission;

means responsive to the low-load power-on control signal for producing a valve control signal until the detected gear ratio reaches a gear ratio provided when the upshift is commanded; and means for preventing application of the first working signal pressure to the control valve in the presence of the valve control signal.

* * * * *